United States Patent [19]

Taylor, Jr.

[11] 4,121,212
[45] Oct. 17, 1978

[54] DOUBLE SIDEBAND PULSE RADAR

[75] Inventor: Taylor, Jr. John W., Baltimore, Md.

[73] Assignee: Westinghouse Electric Corp., Pittsburgh, Pa.

[21] Appl. No.: 838,697

[22] Filed: Oct. 3, 1977

Related U.S. Application Data

[63] Continuation of Ser. No. 634,210, Nov. 21, 1975, abandoned.

[51] Int. Cl.² ............................................. G01S 7/28
[52] U.S. Cl. ................................. 343/17.1 R; 343/7.7
[58] Field of Search ........................... 343/7.7, 17.1 R

[56] References Cited

U.S. PATENT DOCUMENTS

| | | | |
|---|---|---|---|
| 3,068,471 | 12/1962 | Erst | 343/14 |
| 3,343,161 | 9/1967 | Bilottet | 343/7.7 |
| 3,383,686 | 5/1968 | Davis et al. | 343/17.2 R |
| 3,631,490 | 12/1971 | Palmieri | 343/7.7 |
| 3,659,293 | 4/1972 | Gupta | 343/14 |
| 3,696,417 | 10/1972 | Pedersen | 343/7.7 |
| 3,832,709 | 8/1974 | Klein et al. | 343/7.7 |
| 3,858,219 | 12/1974 | Hull | 343/17.1 R |
| 3,896,434 | 7/1975 | Sirven | 343/17.1 R |
| 3,905,033 | 9/1975 | Moore et al. | 343/7.7 |
| 3,939,474 | 2/1976 | Coleman et al. | 343/17.1 R |
| 3,981,013 | 9/1976 | Christensen | 343/17.1 R |
| 4,008,472 | 2/1977 | Nirasawa | 343/17.1 R |
| 4,017,855 | 4/1977 | Buck et al. | 343/18 E |
| 4,041,489 | 8/1977 | Lewis | 343/17.1 R |

Primary Examiner—Howard A. Birmiel
Attorney, Agent, or Firm—R. M. Trepp

[57] ABSTRACT

A pulse radar system transmits a pulse containing an upper and a lower sideband frequency signal. The upper and lower sideband signals are formed by a stable local oscillator signal and a coherent oscillator signal which are mixed in a mixer. The frequency separation between the upper and lower sidebands is sufficient to cause fluctuations in the desired target radar cross section to be statistically independent with respect to the upper and lower sideband frequency components in the transmitted pulse. Target reflected pulses are separately processed for each transmitted frequency component. The probability of detection is improved by mathematically combining the separately-processed output signals of each frequency component.

25 Claims, 8 Drawing Figures

DOUBLE SIDEBAND PULSE RADAR

ACKNOWLEDGMENT OF GOVERNMENT CONTRACT

The invention herein described was made in the course of or under a contract with the Department of the Navy.

This is a continuation of application Ser. No. 634,210 filed Nov. 21, 1975, now abandoned.

BACKGROUND OF THE INVENTION

1. Field of the Invention

This invention relates to pulse radar, particularly to pulse doppler radar, which may be used in a search, track, or mapping mode.

2. Description of the Prior Art

Present pulse doppler radar systems transmit one or two frequencies to detect moving targets such as an aircraft against a background of ground terrain or sea. A single frequency radar has one transmitter which can generate an instantaneous peak power output and an average power output to the antenna. The frequency source for the transmitter is generated by mixing the signals from a stable local oscillator (STALO) and from a coherent oscillator (COHO) followed by selecting one of the frequency sidebands with a frequency filter. The most expensive subsystems of the radar are the transmitter and the stable local oscillator. The transmitter involves costly components and stringent requirements on frequency stability for the radar to maintain its ability to suppress ground clutter echoes with a moving target indicator (MTI). The stable local oscillator cost is directly related to the specified MTI capability to remove ground clutter echoes.

In a single frequency pulse doppler radar, the target radar cross section of an aircraft fluctuates slowly, caused by small changes in heading of the aircraft and its motion relative to the radar site. In order to achieve a high detection probability with such a fluctuating target, it is necessary to radiate sufficient power to detect the echo at those times when the radar cross section is much smaller than average. Another problem in a single frequency radar is that no MTI output is produced when a target moves toward or away from the radar a distance equal to an integral number of half wavelengths of the transmitted frequency during the interval between pulses. Therefore the radar cannot see targets at a number of fixed radial velocities or "blind speeds" since there is no output from the MTI.

In a two frequency pulse doppler radar, a single antenna is used to transmit and receive two frequencies, greatly reducing the blind speed problem. The remainder of the equipment associated with the radar is duplicated for each frequency; for example, two transmitters, mixers, STALO'S, COHO'S, synchronizers, code generators and duplexers are required. In addition, two diplexers and two receivers are required. The duplication of the equipment for two frequencies is the major disadvantage of present diplex operation, especially for the transmitter and the stable local oscillator which is expensive to build to the required frequency stability in order to obtain a specified MTI capability.

SUMMARY OF THE INVENTION

A pulse radar system transmits from a single transmitter, radar pulses of length T containing a first component having a frequency F3 and a second component having a frequency F4. The frequencies F3 and F4 are derived from a common mixer having an input F1 from a stable local oscillator and an input F2 from a coherent oscillator. The frequencies F3 and F4 have sufficient frequency separation to cause fluctuations of a desired target radar cross section to be considered statistically independent for the two frequencies transmitted. Signals or echoes received by the radar corresponding to the two transmitted frequencies may be processed in two receivers with the outputs after the detector stage being aligned in time and mathematically combined. The output may be fed to a plan position indicator (PPI) display or digital target extractor, usually after one or more stages of integration. The time alignment of the signals after the detector stage is necessary, because the transmitter transmits the two frequencies in sequence, one after the other. The transmitter may operate at the peak power output limit and at an increased average power by using the maximum pulse duration permissable. The maximum pulse duration is restricted by the minimum radar range and the maximum aircraft target velocity.

DESCRIPTION OF THE PREFERRED EMBODIMENTS

Figure 1:
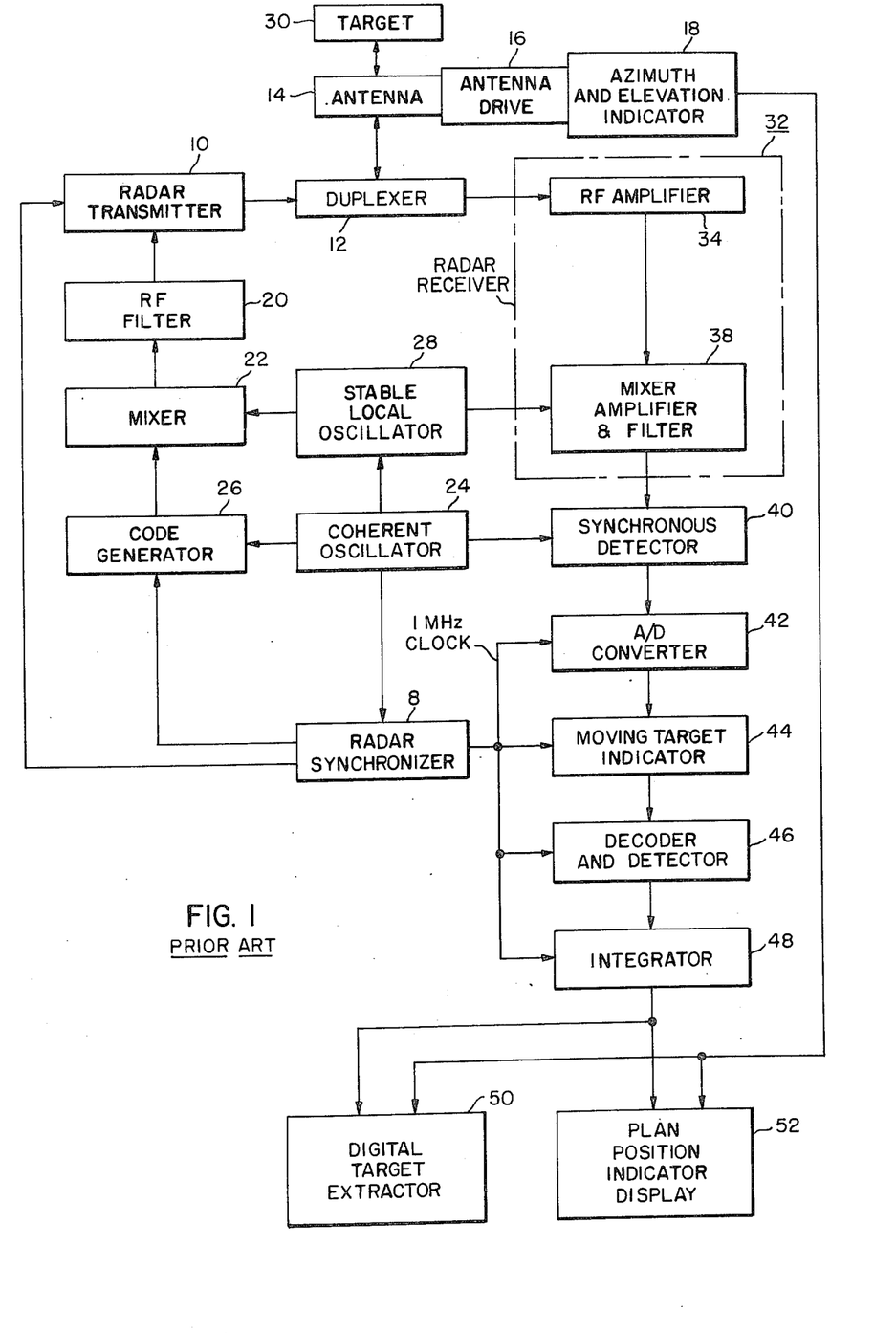
FIG. 1 is a schematic block diagram of a prior art pulse doppler radar.

Referring to FIG. 1, a schematic block diagram is shown of a prior art single frequency pulse doppler radar. A radar synchronizer 8 provides control signals to radar transmitter 10 to generate radar pulses of a specified duration T and at a specified pulse repetition rate. The radar pulses from radar transmitter 10 are fed to duplexer 12 which in turn feeds antenna 14. Antenna 14 is directed by antenna drive 16. The azimuth and elevation in which the antenna is pointing is indicated by azimuth and elevation indicator 18. Antenna 14 directs radar pulses and receives reflected radar pulses in the direction the antenna is pointing. Radar transmitter 10 is supplied RF energy from RF filter 20 having an input from mixer 22. Coherent oscillator 24 provides a signal to code generator 26 and stable local oscillator 28. Code generator 26 also receives a control signal from radar synchronizer 8 which modulates the signal from the coherent oscillator 24 with a predetermined code. The phase coded signal from code generator 26 is fed to mixer 22. Stable local oscillator 28 provides an RF signal to mixer 22. The two input signals are mixed in a conventional mixer forming frequency products having the sum and difference of the two signals fed into the mixer. The sum frequency of the two input signals to the mixer is known as the upper sideband frequency and the difference frequency of the two inputs to the mixer is known as the lower sideband frequency. The RF filter 20 is designed to pass either the upper or lower sideband frequency and to attenuate all other frequencies. The radar transmitter 10 is thereby provided a signal from the filter 20 which may be phase coded and of a frequency derived from a mixer with inputs from a stable local oscillator 28 and coherent oscillator 24.

Antenna 14 receives reflected radar pulses from targets, such as target 30, and feeds the signals through duplexer 12 to radar receiver 32. Within the radar receiver 32 the signals are amplified by RF amplifier 34 and then fed to mixer amplifier and filter 38 where the signal is mixed with a signal from the stable local oscillator 28. The output of the mixer amplifier and filter 38 is typically an intermediate frequency (IF) signal which is conveniently filtered in a filter having a pass band of 1 MHz and is fed to a conventional synchronous detector 40 along with an input from coherent oscillator 24. The output signal from the synchronous detector 40 may be converted to a digital signal by a suitable analog to digital (A/D) converter 42 at 1 MHz intervals dictated by a clock input from synchronizer 8, and the digital signal may be applied to a suitable conventional moving target indicator (MTI) 44 along with an input from radar synchronizer 8. At the output of the moving target indicator 44 all amplitude information is intentionally ignored, and phase information is fed to decoder and detector 46. This process is known as "hard limiting" and prevents the detection of improperly-coded signals, no matter how strong. The output or phase coded radar pulse is decoded and detected for each reflected radar pulse or echo received by antenna 14. Decoder and detector 46 has the codes used by code generator 26 built in or hard wired for use in decoding. The output of decoder and detector 46 is fed to integrator 48 where the detected radar pulses are accumulated during the time the antenna scans past the target. Radar synchronizer 8 provides timing information in the form of a 1 MHz clock to decoder and detector 46 and integrator 48. The output of integrator 48 is fed to a digital target extractor 50 and a plan position indicator display 52 along with the signal from the azimuth and elevation indicator 18.

The disadvantage of the pulse doppler radar as shown in FIG. 1 is that it operates on a single transmitted frequency and at a power usually limited by the transmitter peak output power while the transmitter operates well below its average power capability. The single frequency radar requires additional power to compensate for fluctuations in the target radar cross section to obtain acceptable probabilities of detection.

Fluctuations in target radar cross section, for example, are found to occur from aircraft because echoes are produced from a number of physically separated scatterers: engines, cockpit, nose, etc. As the aircraft changes aspect, the range extent $\Delta R$ of the separation of these scatterers in the range dimension alters. Sometimes their echoes tend to add nearly in phase, producing a composite echo much larger than average. Conversely at other times, they add destructively, producing a weaker than average echo. Experimental data on many aircraft have shown that the target cross section 94 has a probability-density function given by $$p(\sigma) = 1/\overline{\sigma} e^{-\sigma/\overline{\sigma}} \quad (1)$$

where $\overline{\sigma}$ is the average cross section. Most aircraft exhibit a relatively slow fluctuation in radar cross section, such that the values of $\sigma$ for successive scans of the radar beam past the target are statistically independent but $\sigma$ remains constant from one pulse to the next. The radar cross section of a target is a quantitative measure of the ratio of power density in the vector signal scattered in the direction of the receiver to the power density of the radar wave incident upon the target. The power density in the vector signal scattered in the direction of the receiver will affect the instantaneous signal to noise ratio and affect the probability of detection in the detector.

Figure 2:
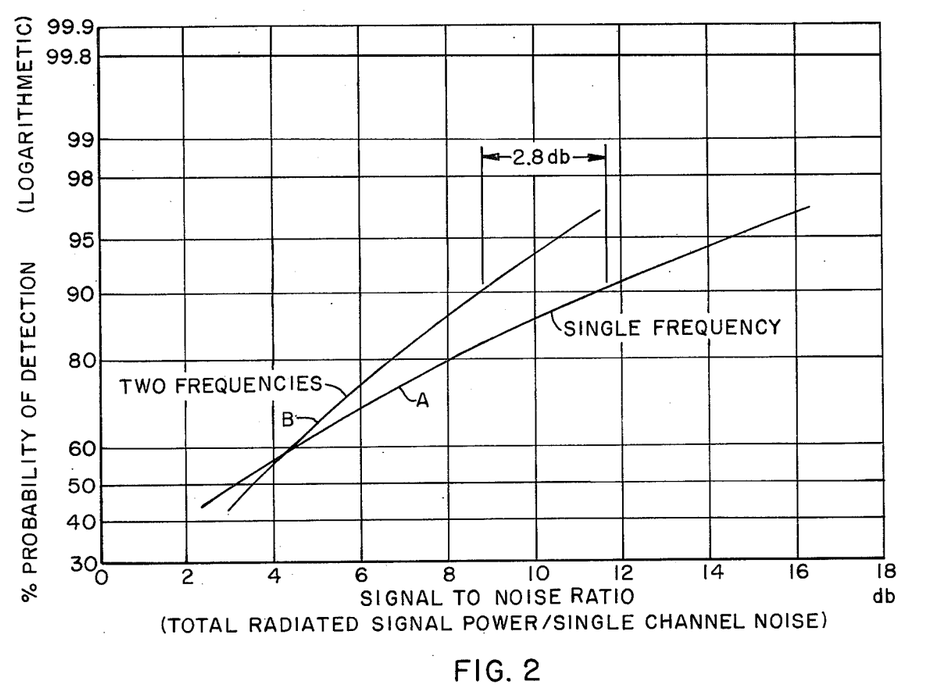
FIG. 2 is a graph showing the relationship between total radiated signal power using one or two frequencies from a radar and the probability of detection of an aircraft.

The probability of detection of a target exhibiting a slow fluctuation of radar cross section is shown in FIG. 2 Curve A for a radar operating on a single frequency, as a function of total radiated signal power to single receiver channel noise. A target exhibiting a slow fluctuation in radar cross section as described by Equation (1) is also known as a Swerling 1 aircraft as described in Section 2.4 on pages 2-18 and 19 and by Equation (24) in "Radar Handbook" by Merrill I. Skolnik, McGraw-Hill Book Company, 1970, which is hereby incorporated by reference. Additional information may be found in "Probability of Detection for Fluctuating Targets", by P. Swerling, IRE Transactions, Vol. IT-6, pages 269-308, April, 1960, which is hereby incorporated by reference.

The probability density function of a target cross section $\sigma$ may be described by Equation (1) for each frequency transmitted. The probability density function of the target cross section $\sigma$ can be considered will be statistically independent for each frequency if the frequencies differ by an amount determined by the physical size of the target such as an aircraft. More precisely, the frequency separation depends upon the range extent ($\Delta R$) of the significant scattering sources of the target. The frequency separation to achieve substantially independent probability density functions as a function of target range extent is shown in Table I. The relative phase of the echoes from the two extremes of the target must differ by at least 360°.

TABLE I

| Target Range Extent | Necessary Frequency Separation |
|---|---|
| 3 meters | 50 Megahertz |
| 5 meters | 30 Megahertz |
| 10 meters | 15 Megahertz |

With adequate frequency separation the instantaneous value of the probability density function of the target cross section $\sigma$ will be considered statistically independent from one another. The probability of detection of a target exhibiting a slow fluctuation in radar cross section is shown in FIG. 2 Curve B for a radar operating on two frequencies with independent echo fluctuations as a function of signal-to-noise ratio. Note that in FIG. 2 on the upper portion of curve B, diplex operation or the transmission of two frequencies becomes increasingly beneficial as higher probabilities of detection are desired. At 90% probability of detection, the benefit of 2.8 decibels with Curve B compared to Curve A is nearly equivalent to a doubling of power transmitted for the single frequency radar Curve A.

Figure 3:
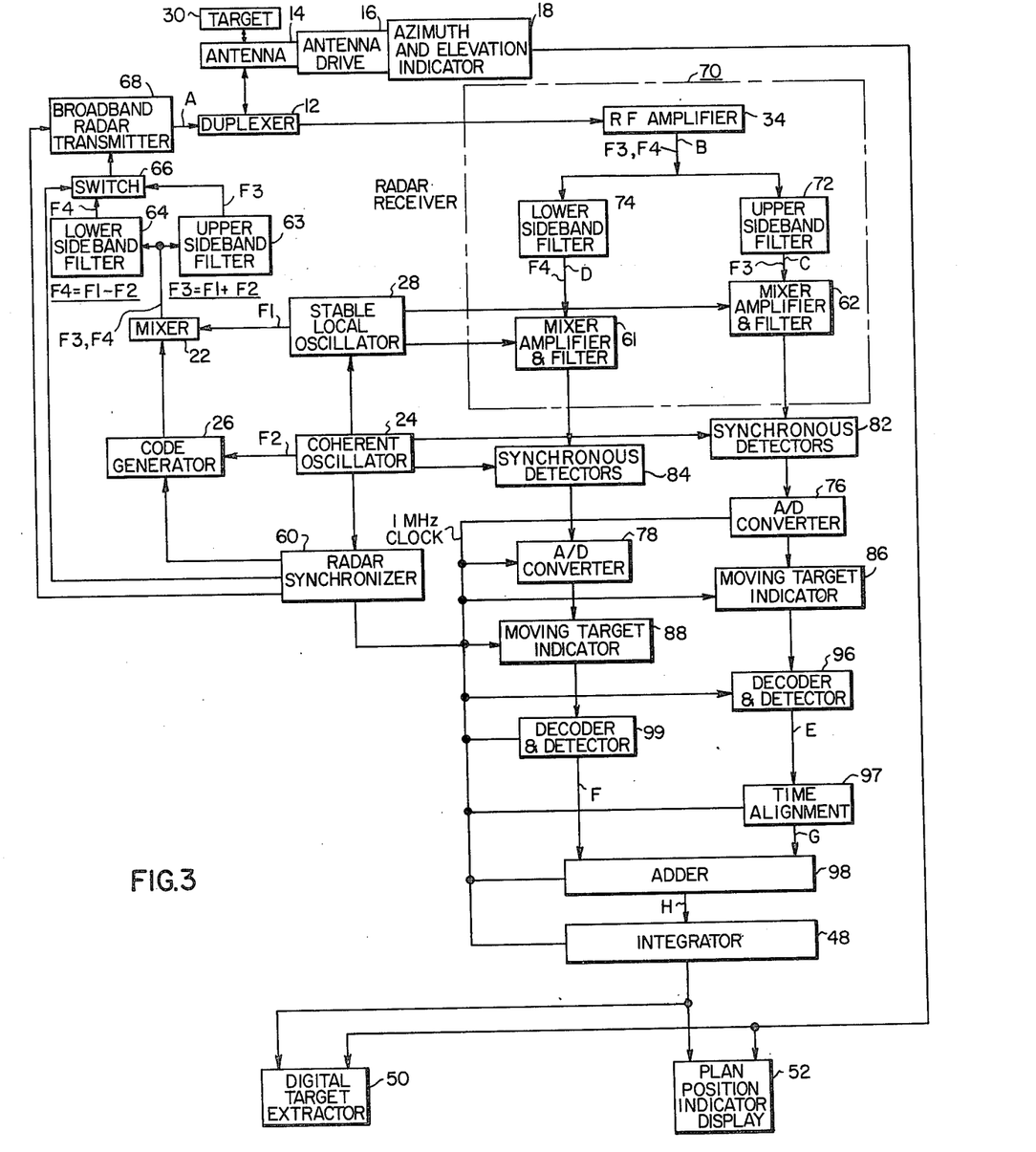
FIG. 3 is a schematic block diagram of an illustrative embodiment of the present invention.

Referring now to FIG. 3, a block diagram of the embodiment of the invention is shown. Reference numerals used in FIG. 3 which were also used in FIG. 1 indicate that the function and the hardware apparatus required to implement that function is the same as that in FIG. 1 and is conventional to one skilled in the art. Coherent oscillator 24 generates a frequency of one-half the desired frequency separation of the transmitter and feeds this frequency signal to the stable local oscillator 28, the code generator 26 and the radar synchronizer 60. A typical frequency for this coherent oscillator is approximately 30 Megahertz which would provide a transmitter frequency separation of 60 Megahertz. Code generator 26 modulates or impresses upon the signal from the coherent oscillator 24 a phase coded signal such as code A or code B which code may depend upon which of the two frequencies is being transmitted at that particular moment in the radar pulse of length T. The output of the code generator is supplied to mixer 22. Code generator 26 also has an input from radar synchronizer 60 which provides timing information such as code initiate, code rate, and code sequence. Radar synchronizer 60 is similar to radar synchronizer 8 except that it generates a code for each sideband component and actuates switch 66 at the proper time. Stable local oscillator 28 provides the carrier frequency for the radar and is fed to mixer 22 and to mixer amplifier 61 and mixer amplifier 62. A typical frequency for the stable local oscillator, for example, may be L band at 1.3 Gigahertz. The mixer 22 mixes the signal from the stable local oscillator 20 with the signal from the coherent oscillator 24 after it passes through code generator 26. The mixer provides an output signal with frequencies $F3 = F1 + F2$ and $F4 = F1 - F2$ where $F1$ is equal to the stable local oscillator frequency 28 and $F2$ is equal to the coherent oscillator 24 frequency. The phase code impressed on the signal and the pulse shape (square wave envelope) will add a given bandwidth to the signal. In the prior art only one sideband would be selected for transmission by the transmitter.

The output frequencies of the mixer 22 is fed to the upper sideband filter 63 and the lower sideband filter 64 which may be constructed similar to RF filter 20 and may be a cavity or YIG design. The upper sideband filter 63 passes frequencies near F3 in a bandwidth of several Megahertz and rejects or attenuates all other frequencies presented to it by the mixer 22 such as the lower sideband. The upper sideband filter provides a very pure signal at the frequency F3 with a predetermined phase to switch 66. The lower sideband filter 64 passes the signal from the mixer near frequency F4 in a bandwidth of several Megahertz and rejects or attenuates all other frequencies from the mixer 22 such as the upper sideband. The lower sideband filter 64 feeds a very pure signal at the frequency F4 with a predetermined phase to switch 66 at the frequency F4.

Figure 4:
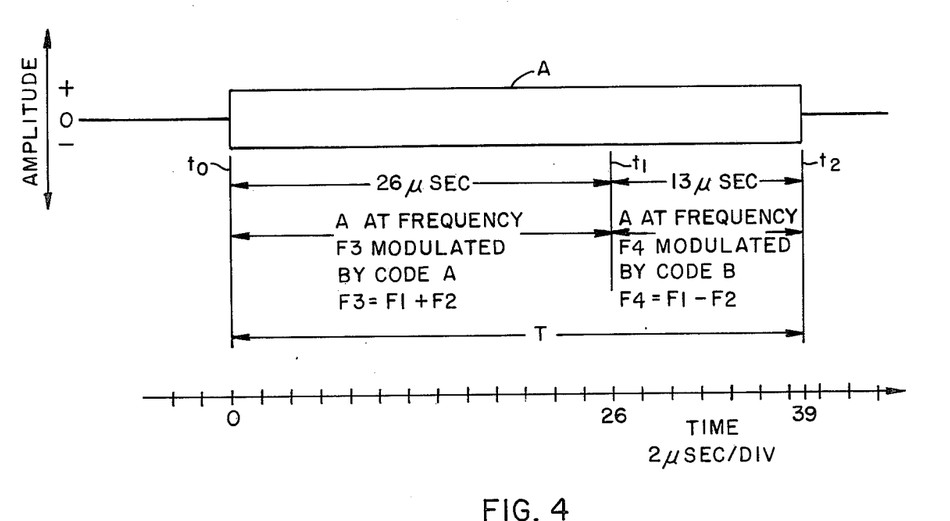
FIGS. 4, 5, 6A, 6B and 6C are graphical representations of signal waveforms useful in understanding the operation of the present invention.

Switch 66 which is conventional in the art (such as a diode network) passes on to broadband radar transmitter 68 either the signal F3 with a predetermined phase from the upper sideband filter 63 or the signal F4 with a predetermined phase from the lower sideband filter 64. Switch 66 also receives timing pulses from radar synchronizer 60 to actuate switch 66 at the proper time to determine the component or frequency from $t_0$ to $t_1$, and from $t_1$ to $t_2$ in the radar pulse of length T as shown in FIG. 4. Broadband radar transmitter 68 which is conventional in the art is capable of transmitting and amplifying, such as in a single broadband amplifier stage, the upper sideband signal F3 having an initial phase $P_1$ or the lower sideband frequency F4 having an initial phase $P_2$ which are transmitted sequentially in a manner to be described. The broadband radar transmitter 68 receives timing pulses from radar synchronizer 60 to generate radar pulses of length T as shown in FIG. 4.

The output radar pulse of length T of the broadband radar transmitter 68, identified as signal A, is presented to duplexer 12 and antenna 14. Duplexer 12 is a conventional duplexer which either connects the transmitter to the antenna 14 or connects the radar receiver 70 to antenna 14. Antenna 14 is a conventional radar antenna with a predetermined beam shape such as beam width in the azimuth and elevation directions. Associated with antenna 14 is antenna drive 16 and azimuth and elevation indicator 18.

Antenna 14 receives electromagnetic radiation such as target reflected pulses and passes the received radiation through duplexer 12 to radar receiver 70 and to RF amplifier 34 within the radar receiver 70. Antenna 14 receives electromagnetic radiation from targets above the ground and sea, such as target 30, which energy constitutes target reflected pulses or target reflected echoes. RF amplifier 34 amplifies the energy received from the antenna 14 and has an output identified as signal B which is fed to upper sideband filter 72 and lower sideband filter 74, which filters may be duplicates of filters 63 and 64. Upper sideband filter 72 is a pass band filter which passes signals within a frequency range associated with F3. The lower sideband filter 74 has a pass band for signals associated with frequency F4. The upper sideband filter 72 rejects or attenuates signals which are not in the specified frequency range and especially is designed to reject signals that would be in the pass band of the lower sideband filter 74. Upper sideband filter 72 has an output signal C which is fed to upper sideband mixer amplifier and filter 62 which is similar in construction to mixer amplifier 38. The lower sideband filter 74 rejects or attenuates signals which are not in the specified pass band of the lower sideband filter and is especially designed to reject signals which are of the frequency of the pass band of the upper sideband filter 72. The output signal D of the lower sideband filter 74 is fed to lower sideband mixer amplifier and filter 61 which is similar in construction to mixer amplifier 38. Stable local oscillator 28 supplies a frequency signal to the upper sideband mixer amplifier and filter 62 which is mixed with the signal C coming from the upper sideband filter 72 in a conventional manner to form an output at an intermediate frequency corresponding to F2 of the coherent oscillator 24 and containing doppler shift frequency elements and phase shift elements due to the reflection of the signals from targets. The output signal D of lower sideband filter 74 is fed to lower sideband mixer amplifier and filter 61. Lower sideband mixer amplifier and filter 61 mixes the signal D from the lower sideband filter 74 with a signal received from stable local oscillator 28 to form an output which constitutes the intermediate frequency signal for the lower sideband corresponding to the frequency F2 of the coherent oscillator 24 and containing doppler shift frequency elements due to moving targets (doppler effect) and phase shift elements. The upper sideband mixer amplifier and filter 62 supplies a signal to the upper sideband synchronous detector 82 which may be of conventional design used in radar receivers such as synchronous detector 40. Upper sideband synchronous detector 82 also receives a signal from coherent oscillator 24. The analog output of upper sideband synchronous detector 82 (including in-phase and quadrature components) is converted at 1 MHz intervals dictated by a clock input from synchronizer 60 to a digital output by an analog to digital converter 76 which is conventional in the art such as A/D converter 42. The converted digital signal from analog to digital converter 76 is fed to an upper sideband moving target indicator 86. The upper sideband moving target indicator 86 is of conventional design as found in the art such as MTI 44 and receives a 1 MHz clock signal from radar synchronizer 60. The output of the upper sideband moving target indicator 86 is fed to the upper sideband decoder and detector 96 which is conventional such as decoder 5 and detector 46 with self-contained hard wired codes. Decoder and detector 96 also receives a 1 MHz clock signal from the radar synchronizer 60. The upper sideband decoder and detector 96 correlates the self-contained code with the code of the received signal in the receiver. The phase code is an aid to compress the signal from the target by correlation and to reject or attenuate other signals which do not have the code as impressed upon the original transmitted radar pulse signal by code generator 26. The upper sideband decoder and detector 96 operates on the in-phase and quadrature channels of the signal coming from upper sideband moving target indicator 86. The output signal E of the upper sideband decoder and detector 96, which combines in-phase and quadrature data, is fe to time align 97 which also has a 1 MHz clock input from radar synchronizer 60. The output signal G of time align 97 is fed to adder 98.

The output of lower sideband mixer amplifier and filter 61 is fed to the input of lower sideband synchronous detector 84 which also receives an input from coherent oscillator 24. The synchronous detector 84 is conventional in the state of the art such as synchronous detector 40. The output of the synchronous detector 84 is fed to an analog to digital converter 78 which converts the output signal of synchronous detector 84 (including in-phase and quadrature components) to a digital signal. The analog to digital converter 78 which receives a 1 MHz clock input from synchronizer 60 is conventional in the state of the art, such as A/D converter 42. The output of the analog to digital converter 78 is fed to lower sideband moving target indicator 88 which also has a 1 MHz clock input signal from radar synchronizer 60. The moving target indicator 88 is conventional in the state of the art such as MTI 44 and the output is fed to lower sideband decoder and detector 99. The lower sideband decoder and detector 99 has self-contained hard wire codes and is conventional in the state of the art such as decoder and detector 46. The decoder and detector 99 also has a 1 MHz clock input from radar synchronizer 60. The decoder and detector 99 correlates and compresses any output signals from the moving target indicator 88 with the respective code (phase code) impressed upon the transmitted pulse and received and passed through the lower sideband filter 74. The output signal F of the lower sideband decoder and detector 99 is fed to adder 98 which also has a 1 MHz clock input from radar synchronizer 60 and an input from time align 97. It is generally desirable to employ different phase codes for the upper and lower sideband transmissions, so that echoes may be separated in the receiver both by frequency and coding. The use of "hard limiting" prior to decoding prevents the detection of very strong echoes in the wrong receiver.

Time align 97 consists of a suitable storage means which, for example, may be a digital shift register. The purpose of the storage means is to hold or delay signal E for a specified amount of time so that the two signals E and F, one in each upper and lower sideband channel, will be aligned in time even though the source of the two signals E and F may have originally been transmitted at different times such as one after the other in the radar pulse A of length T. After appropriate alignment of the signals in each channel, they are mathematically combined in adder 98 which might include multiplication allowed by addition and the output signal H is sent to integrator 48. The probability of detection is most improved by adding the amplitudes of the two frequency components rather than by selection of the larger amplitude, but either of these two or other mathematical alternatives may be employed. Integrator 48 is conventional in the state of the art and integrates a number of pulses resulting from one scan of the radar antenna 14. Integrator 48 also has a 1 MHz clock input from radar synchronizer 60. The output of integrator 48 is fed to plan position indicator display 52 and digital target extractor 50. Plan position indicator display 52 and digital target extractor 50 also receive an input signal from azimuth and elevation indicator 18.

The operation of the present invention is described with reference to FIGS. 3, 4, 5, 6A, 6B and 6C. A suitable frequency for the stable local oscillator 28 may be, for example, 1.3 Gigahertz. A suitable frequency for the coherent oscillator 24 may be, for example, 30 Megahertz, which would provide a frequency separation of 60 Megahertz between the upper sideband frequency and the lower sideband frequency passing through filters 63 and 64. A 60 Megahertz frequency separation would make slow fluctuations in target radar cross section having a range extent of 3 meters virtually uncorrelated or statistically independent.

With reference to FIG. 4 single rectangular pulse A is shown having a pulse length T extending from $t_0$ to $t_2$ with a relative amplitude of 1 unit between $t_0$ and $t_2$. The frequency F3 from upper sideband filter 63 may be transmitted with an initial phase $P_1$ as a component of the radar pulse of length T, signal A, by the broadband radar transmitter 68 for 26 microseconds extending from $t_0$ to $t_1$ as shown in FIG. 4. The frequency F4 from lower sideband filter 64 may be transmitted as part of signal A with an initial phase $P_2$ by the broadband radar transmitter 68 for 13 microseconds extending from $t_1$ to $t_2$ as shown in FIG. 4. By transmitting the two frequencies F3 having an initial phase $P_2$ and F4 having an initial phase $P_2$ in sequence, the peak power of the broadband radar transmitter 68 is fully utilized since each frequency may be transmitted at peak power. The average power on duty cycle of the broadband radar transmitter 68 may be increased by transmitting signal A as the longest pulse possible, which is particularly desirable for broadband radar transmitters using traveling wave tubes (TWT), cross-field amplifiers (CFA) or solid state amplifiers.

Each frequency transmitted in the radar pulse may be uniquely coded such as by code A and code B by a one microsecond quadraphase code originating from synchronizer 60 or code generator 26. The code permits use of pulse compression techniques to obtain range resolution and permits the receiver to discriminate between received signals that were transmitted at frequencies F3 and F4. The duration of F3 in the radar pulse is selected with consideration for the maximum velocity of targets to be detected, together with the carrier frequency. If the target velocity causes a 90° phase change in the received signal during the reception of the pulse, sensitivity may be degraded, for example, by about one decibel. A 26 microsecond duration at frequency F3, as shown in FIG. 4, was selected as suitable for the target velocities of interest. The duration of F4 in the radar pulse is selected in view of the minimum range at which aircraft might be detected because echoes from aircraft cannot be received while the radar pulse is being transmitted. A 13 microsecond duration of F4 in the radar pulse would enable detection of targets as close as one-half mile since 6.5 microseconds of F4 would be enough for detection. The radar would essentially be operating at a single frequency F4 for short range targets between one-half mile and two miles, which is acceptable because the echoes are strong. At a target range of 2 miles or greater the radar can detect targets from both the 26 microsecond F3 component and the 13 microsecond F4 component in the radar pulse. The transmitted components F3 and F4 in the radar pulse are each at identical phase conditions, $P_1$ and $P_2$ respectively, each time transmission is initiated to obtain coherent operation, which is facilitated by having a single stable local oscillator 20, coherent oscillator 24, and transmitter 68 common to both transmissions.

A single frequency radar having a requirement for target detection at a minimum range of one-half mile would be limited to a 13 microsecond radar pulse. In applicant's invention the transmission of two coherent frequencies F3 and F4 in sequence permits the use of a 39 microsecond radar pulse, which is a 4.8 decibel (db) increase in average power, while not affecting the peak power limit of the transmitter. In addition, the dual frequency operation results in a calculated sensitivity improvement at 90% probability of detection of 2.6 dB utilizing the waveform as shown in FIG. 4. This compares to a 2.8 dB sensitivity improvement at 90% probability of detection for a balanced transmission of components F3 and F4 in the radar pulse, the results of which are shown in FIG. 2. The total gain in sensitivity is 4.8 db × 2.6 db or 7.4 db.

Figure 5:
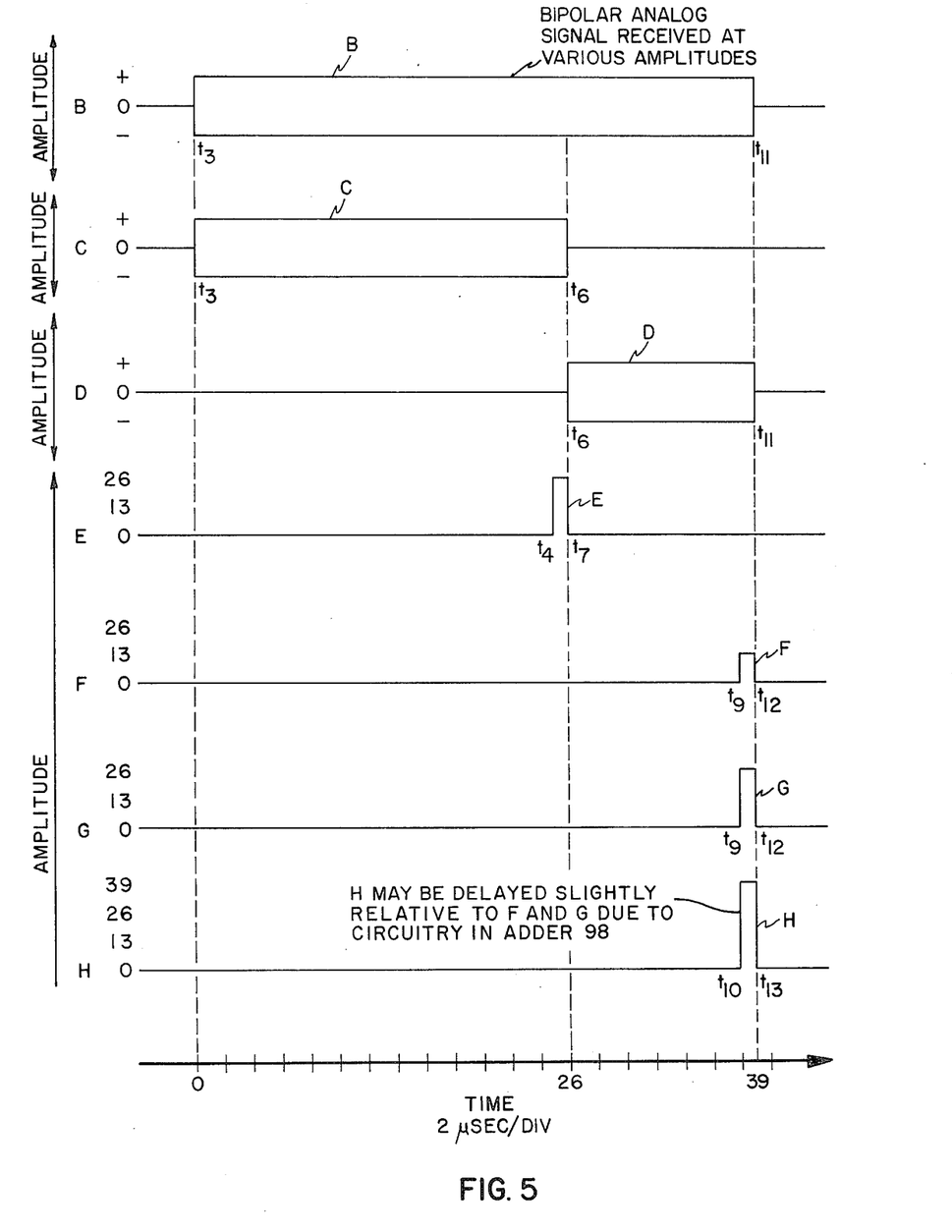

Referring now to FIG. 5, various waveforms at different points in the receiver are shown in an idealized form with representative numerical amplitudes without noise, for a transmitted radar pulse A as shown in FIG. 4 reflected from a target 30 and received by antenna 14. The target reflected pulse B extending from $t_3$ to $t_{11}$ is shown at the output of RF amplifier 34 and is similar to the radar pulse A shown in FIG. 4 except for a frequency shift due to target velocity and a phase shift due to the target range. The output of the upper sideband filter 72 is shown in FIG. 5 as waveform C extending from $t_3$ to $t_6$. Waveform C comprises frequency F3 and associated doppler effect frequencies. The output of lower sideband filter 74 is shown in FIG. 5 as waveform D extending from $t_6$ to $t_{11}$. Waveform D comprises frequencies F4 and associated doppler effect frequencies. Ideally, frequencies near F3 (or within several Megahertz of F3) should not pass or leak through lower sideband filter 74 and appear at the output on waveform D. Similarly, frequencies near F4 (or within several Megahertz of F4) should not pass or leak through upper sideband filter 72 and appear at the output on waveform C. Practically, the frequencies appearing on waveforms C and D are not mutually exclusive, and use of different codes is a further means of totally discriminating between the two components.

The output of the upper sideband decoder and detector 96 is shown in FIG. 5 as waveform E extending from $t_4$ to $t_7$ which is essentially the pulse compression of waveform C performed by comparing the received code in waveform C with the respective transmitted code contained in decoder and detector 96. The output of the lower sideband decoder and detector 99 is shown in FIG. 5 as waveform F extending from $t_9$ to $t_{12}$, which is essentially the pulse compression of waveform D performed by comparing the received code in waveform D with the respective transmitted code contained in decoder and detector 99. Since the components containing F3 and F4 in radar pulse A were transmitted in sequence, the detection of the waveforms reflected from a target also occur in sequence as shown in FIG. 5 by waveforms E and F.

In order to provide for the addition of waveforms E and F at the same time, time align 97 is provided to delay waveform E by a specified amount of time so that waveform E will be aligned with waveform F as shown in FIG. 5 by waveform G extending from $t_9$ to $t_{12}$. Waveforms F and G are presented to adder 98 which mathematically combines the waveforms F and G and provides an output as shown in FIG. 5 waveform H extending from $t_{10}$ to $t_{13}$. Due to the frequency separation of F3 and F4, the fluctuations in target radar cross section are tantamount to being statistically independent. The amplitudes in waveforms F and G being derived from reflected signals also have fluctuations which are uncorrelated. The improvement in the probability of detection for the two frequency radiated pulse of equal duration is shown in FIG. 2. The output of adder 98 which represents the detection of a target is fed to integrator 48, which is conventional in the state of the art and adds together or accumulates a number of pulses associated with one scan of the antenna 14 across a target 30.

Figure 6A:
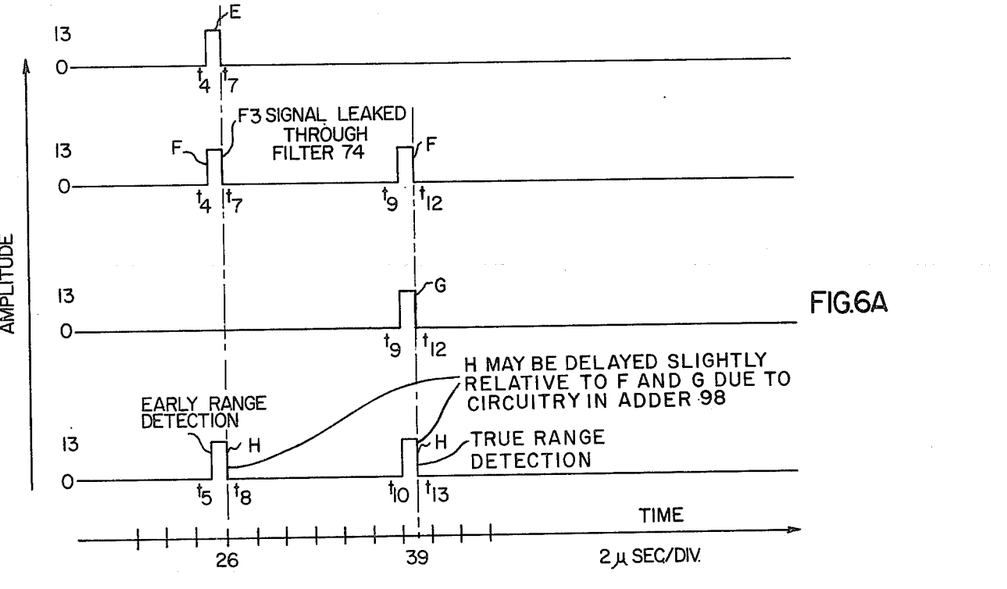
Figure 6B:
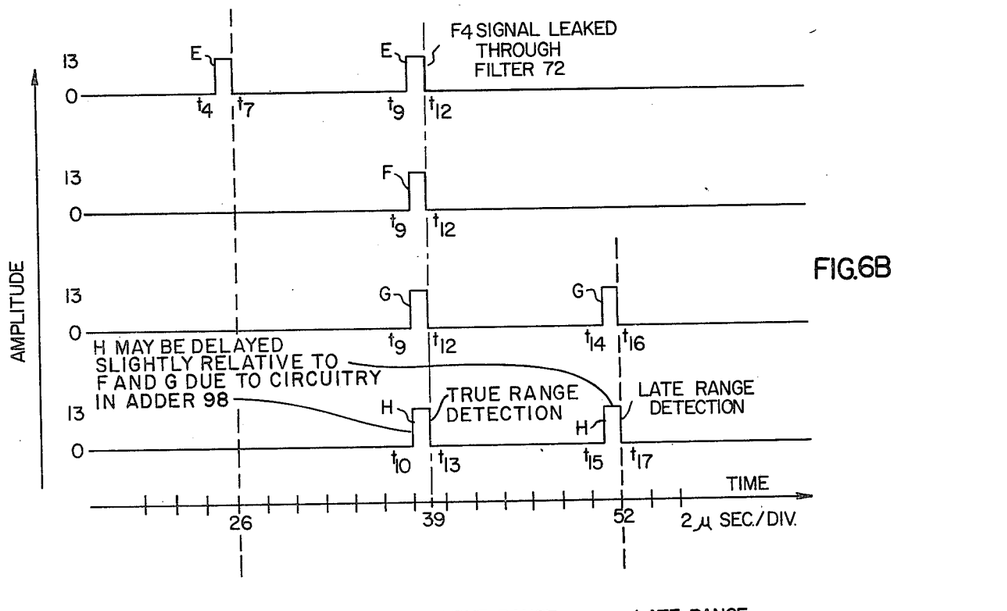
Figure 6C:
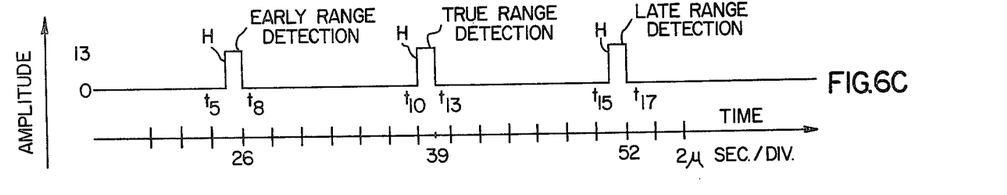

The importance of the use of two different codes for the two sidebands may be illustrated by considering the alternative of equal transmitter component durations in a pulse and identical codes. For proper operation of such a radar, signals having frequencies associated with F3 must not leak through the lower sideband filter 74. If a signal did leak through, the resulting waveforms E and F would be as shown in FIG. 6A with the result that the H waveform would show a detection at an early or closer range extending from $t_5$ to $t_8$ followed by a true detection at the target range extending from $t_{10}$ to $t_{13}$. If frequencies associated with F4 leaked through the upper sideband filter 72, the resulting waveforms E, F, G and H would be as shown in FIG. 6B. Waveform H would show a true detection at the target range from $t_{10}$ to $t_{13}$ and a detection at a late or more distant range from $t_{15}$ to $t_{17}$. If both the upper sideband filter 72 and the lower sideband filter 74 leak frequencies corresponding to the other pass band frequency and frequencies associated with F3 and F4 leak through filters 72 and 74, the resulting waveform H would be as shown in FIG. 6C, wherein a detection is shown at a close range from $t_5$ to $t_8$, the true target range from $t_{10}$ to $t_{13}$ and at a distant target range from $t_{15}$ to $t_{17}$, or in other words, the three range signals would be early, true and late. If the synchronizer 60 or code generator 26 provides a unique code for frequencies associated with F3 and another code for frequencies associated with F4, then the decoder and detectors 96 and 99 which also contain the codes would prevent the early and late range signals which may have leaked through both receiver sideband filters 72 and 74 from showing up on waveforms E, F and H.

It is understood that the radar is coherent by the use of a single stable local oscillator and a single coherent oscillator common to both the transmitter and the receiver where frequencies F3 and F4 are each at an identical phase condition, $P_1$ and $P_2$ respectively, each time transmission is initiated at each frequency. This allows each MTI to suppress terrain clutter echoes from the unwanted sideband frequency, which may have leaked through receiver sideband filter 72 or 74.

I claim:

1. A pulse radar system comprising in combination:

means for transmitting spaced apart radar pulses of length T, said pulses being composed of a first component having a frequency F3 and a second component having a frequency F4, means for receiving target reflected pulses between said spaced apart radar pulses and for processing said pulses, said frequencies F3 and F4 having sufficient frequency separation to cause fluctuations at each frequency F3 and F4 in the radar cross section of a desired target to be statistically independent from each other, said first and second components of said radar pulse being transmitted sequentially in time, said means for processing said pulses including means for detecting targets in each of said first and second components of said radar pulse, means for time aligning the outputs of said detecting means, means for mathematically combining the time aligned outputs of said detecting means, and said means for transmitting radar pulses including a single transmitter of sufficient bandwidth for radiating said pulses, a first oscillator means for generating a first frequency signal, a second oscillator means for generating a second frequency signal, and a mixer means for generating said frequencies F3 and F4 from said first and second frequency signals.

2. The pulse radar system of claim 1 wherein said means for receiving target reflected pulses includes means for receiving frequencies F3 and F4 with the associated doppler shifts.

3. The pulse radar system of claim 1 wherein said first component has an initial phase $P_1$ and said second component has an initial phase $P_2$.

4. The pulse radar system of claim 1 wherein said first component contains a first phase code modulated upon F3, said second component contains a second phase code modulated upon F4, and said means for processing said pulses includes means for separating said components by decoding said first and second phase codes.

5. The pulse radar system of claim 1 wherein said system is pulse doppler.

6. A pulse radar system comprising in combination:

means for transmitting spaced apart radar pulses of length T, said pulses being composed of a first component having a frequency F3 and a second component having a frequency F4, means for receiving target reflected pulses between said spaced apart radar pulses and for processing said pulses, said frequencies F3 and F4 differing by an amount which causes the relative phase of the target reflected pulses reflected from significant scattering sources on a desired target over a range extent $\Delta R$ to differ by at least 360°, said first and second components of said radar pulse being transmitted sequentially in time, said means for processing said pulses including means for detecting targets in each of said first and second components of said radar pulse, means for time aligning the outputs of said detecting means, means for mathematically combining the time aligned outputs of said detecting means, and said means for transmitting radar pulses including a single transmitter of sufficient bandwidth for radiating said pulses, a first oscillator means for generating a first frequency signal, a second oscillator means for generating a second frequency signal, and a mixer means for generating said frequencies F3 and F4 from said first and second frequency signals.

7. The pulse radar of claim 6 wherein for a desired target where said $\Delta R$ is 3 meters, said frequencies F3 and F4 differ by at least 50 MHz.

8. The pulse radar of claim 6 wherein for a desired target where said $\Delta R$ is 5 meters, said frequencies F3 and F4 differ by at least 30 MHz.

9. The pulse radar of claim 6 wherein for a desired target where said $\Delta R$ is 10 meters, said frequencies F3 and F4 differ by at least 15 MHz.

10. The pulse radar system of claim 6 wherein said first component has an initial phase $P_1$ and said second component has an initial phase $P_2$.

11. The pulse radar system of claim 6 wherein said system is pulse doppler.

12. A pulse radar system for transmitting pulses of radio frequency energy and for receiving target reflected pulses comprising in combination:

first oscillator means for generating a first radio frequency signal, second oscillator means for generating a second radio frequency signal, mixer means for generating a third and fourth radio frequency signal from said first and second radio frequency signals, filter means for separating for separating said third radio frequency signal, filter means for separating said fourth radio frequency signal, means for amplifying said third and fourth radio frequency signals, switch means for selectively providing said third and fourth radio frequency signals to said amplifier, timing means for controlling said switch means and said amplifier means for generating amplified pulses of radio frequency energy, antenna means for radiating said pulses of radio frequency energy and for receiving a target reflected echo of said pulses of radio frequency energy, means for connecting said amplifier means to said antenna means, means for processing said target reflected echoes, and wherein said timing means controlling said switch means and said amplifier means provides for the generation of pulses of radio frequency energy containing the third radio frequency signal for a first fixed duration followed by the fourth radio frequency signal for a second fixed duration.

13. The pulse radar system of claim 12 wherein said first radio frequency signal and said second radio frequency signal are selected to provide a predetermined frequency separation between said third and fourth radio frequency signals to cause slow fluctuations of a desired target radar cross section to be statistically independent.

14. The pulse radar system of claim 12 further comprising
code generator means for coding said radio frequency signal,
said timing means including means for controlling said code generator means for selectively coding said second radio frequency signal.

15. The pulse radar system of claim 12 wherein said second fixed duration is limited in time by the minimum 16. The pulse radar system of claim 12 wherein said first fixed duration is limited in time by a 90° phase change of the carrier frequency during the first fixed duration caused by the maximum velocity of desired targets.

17. A method of operating a pulse radar system comprising the steps of:
transmitting spaced apart radar pulses of length T, said pulses being composed of a first component having a frequency F3 and a second component having a frequency F4,
receiving target reflected pulses between said spaced apart radar pulses and processing said pulses,
said frequencies F3 and F4 having sufficient frequency separation to cause fluctuations at each frequency F3 and F4 in the radar cross section of a desired target to be statistically independent from each other,
said first and second components of said radar pulse being transmitted sequentially in time,
said processing said pulses includes the step of detecting targets in each of said first and second components of said radar pulse,
aligning in time the outputs of said step of detecting targets, and
mathematically combining the time aligned outputs of said step of detecting targets, and wherein
said step of transmitting radar pulses include the steps of transmitting with a single transmitter of sufficient bandwidth for radiating said pulses, generating a first frequency signal, generating a second frequency signal, and mixing said first and second frequency signals to generate said frequencies F3 and F4.

18. The method of claim 17 wherein said step of receiving target reflected pulses includes the step of receiving frequencies F3 and F4 with the associated doppler shifts.

19. The method of claim 17 wherein said step of transmitting said first component has an initial phase $P_1$ and said second component has an initial phase $P_2$.

20. The method of claim 17 wherein said step of transmitting said first component contains a first phase code modulated upon F3 and said second component contains a second phase modulated upon F4, and
said step of processing said pulses includes the step of separating said components by decoding said first and second phase codes.

21. A method for operating a pulse radar system comprising the steps of:
transmitting spaced apart radar pulses of length T, said pulses being composed of a first component having a frequency F3 and a second component having a frequency F4,
receiving target reflected pulses between said spaced apart radar pulses and processing said pulses,
said frequencies F3 and F4 differing by an amount which causes the relative phase of the target reflected pulses reflected from significant scattering sources on a desired target over a range extent $\Delta R$ to differ by at least 360°,
said step of transmitting includes transmitting said first and second components of said radar pulse sequentially in time,
said step of processing said pulses includes the steps of detecting targets in each of said first and second components of said radar pulse, time aligning the outputs of said detecting means, and mathematically combining the time aligned outputs of said step of detecting targets, and wherein
said step of transmitting radar pulses include the steps of transmitting with a single transmitter of sufficient bandwidth for radiating said pulses, generating a first frequency signal, generating a second frequency signal, and mixing said first and second frequency signals to generate said frequencies F3 and F4.

22. The method of claim 21 wherein for a desired target where said $\Delta R$ is 3 meters, said frequencies F3 and F4 differ by at least 50 MHz.

23. The method of claim 21 wherein for a desired target where said $\Delta R$ is 5 meters, said frequencies F3 and F4 differ by at least 30 MHz.

24. The method of claim 21 wherein for a desired target where said $\Delta R$ is 10 meters, said frequencies F3 and F4 differ by at least 15 MHz.

25. The method of claim 21 wherein said first component has an initial phase $P_1$ and said second component has an initial phase $P_2$.

* * * * *